(12) United States Patent
Crouse et al.

(10) Patent No.: US 12,171,209 B1
(45) Date of Patent: Dec. 24, 2024

(54) KNOT TYING APPARATUSES AND FISHING RELATED STRUCTURES

(71) Applicants: Robert Norman Crouse, Raleigh, NC (US); Helen Keyle Crouse, Raleigh, NC (US); Andrew Jason Jarrard, Garner, NC (US)

(72) Inventors: Robert Norman Crouse, Raleigh, NC (US); Helen Keyle Crouse, Raleigh, NC (US); Andrew Jason Jarrard, Garner, NC (US)

( * ) Notice: Subject to any disclaimer, the term of this patent is extended or adjusted under 35 U.S.C. 154(b) by 126 days.

(21) Appl. No.: 17/474,978

(22) Filed: Sep. 14, 2021

Related U.S. Application Data

(60) Provisional application No. 63/077,842, filed on Sep. 14, 2020.

(51) Int. Cl.
*A01K 91/04* (2006.01)
*A01K 91/047* (2006.01)

(52) U.S. Cl.
CPC ............ *A01K 91/04* (2013.01); *A01K 91/047* (2013.01)

(58) Field of Classification Search
CPC ...... A01K 91/04; A01K 91/047; A01K 91/03; B65H 69/04; B65H 69/043
See application file for complete search history.

(56) References Cited

U.S. PATENT DOCUMENTS

| | | | | |
|---|---|---|---|---|
| 3,066,372 A | * | 12/1962 | Parker | A01K 91/04 403/209 |
| 3,106,417 A | * | 10/1963 | Clow | A01K 91/04 289/17 |
| 3,131,957 A | * | 5/1964 | Musto | A01K 91/04 289/17 |
| 3,177,021 A | * | 4/1965 | Benham | A01K 91/04 289/17 |
| 3,700,272 A | * | 10/1972 | Bauer | A01K 91/04 289/17 |
| 3,837,691 A | * | 9/1974 | Smythe | A01K 91/04 289/17 |
| 3,877,737 A | * | 4/1975 | Chappell | A01K 91/04 289/17 |

(Continued)

FOREIGN PATENT DOCUMENTS

| | | | |
|---|---|---|---|
| WO | 2005072521 A1 | 8/2005 | |
| WO | WO-2012140420 A1 | * 10/2012 | ............. A01K 91/04 |

*Primary Examiner* — Ismael Izaguirre
(74) *Attorney, Agent, or Firm* — Stanek Lemon Crouse & Meeks, PA

(57) ABSTRACT

An apparatus for tying knots can include a body defined by a length along a longitudinal axis of the body and by an outer surface that extends around the longitudinal axis of the body from a first end of the body to a second end of the body. A trench in the body can extend from the outer surface of the body toward the longitudinal axis for the length of the body. A channel can extend for the length of the body and is exposed at the first and second ends of the body. A neck can be between the trench and the channel, the neck can be configured to contain first and second flexible lines extending in the channel extending from the first end of the body to the second end of the body and a line guide can be on the outer surface of the body configured to hold the first or second line at an oblique angle relative to a direction of the longitudinal axis.

27 Claims, 7 Drawing Sheets

(56) References Cited

U.S. PATENT DOCUMENTS

| | | | |
|---|---|---|---|
| 4,083,479 A * | 4/1978 | Borden | D05B 91/06 |
| | | | 223/100 |
| 5,749,898 A * | 5/1998 | Schulze | A61B 17/0469 |
| | | | 606/228 |
| 5,971,447 A * | 10/1999 | Steck, III | A01K 91/04 |
| | | | 289/17 |
| 6,817,634 B2 | 11/2004 | Champion | |
| 7,309,086 B2 | 12/2007 | Carrier | |
| 7,510,220 B1 | 3/2009 | Wood | |
| 8,511,721 B1 * | 8/2013 | Farner | A01K 91/04 |
| | | | 289/17 |
| 8,794,680 B2 | 8/2014 | Frew | |
| 2009/0300966 A1 | 12/2009 | Wood | |
| 2022/0312752 A1 | 10/2022 | Wills | |

\* cited by examiner

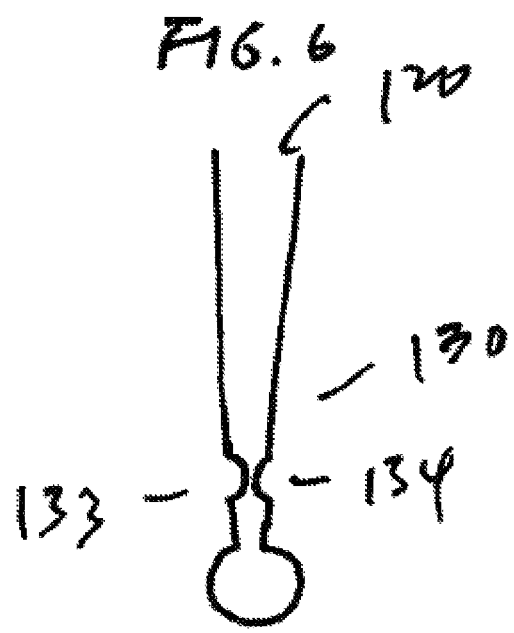

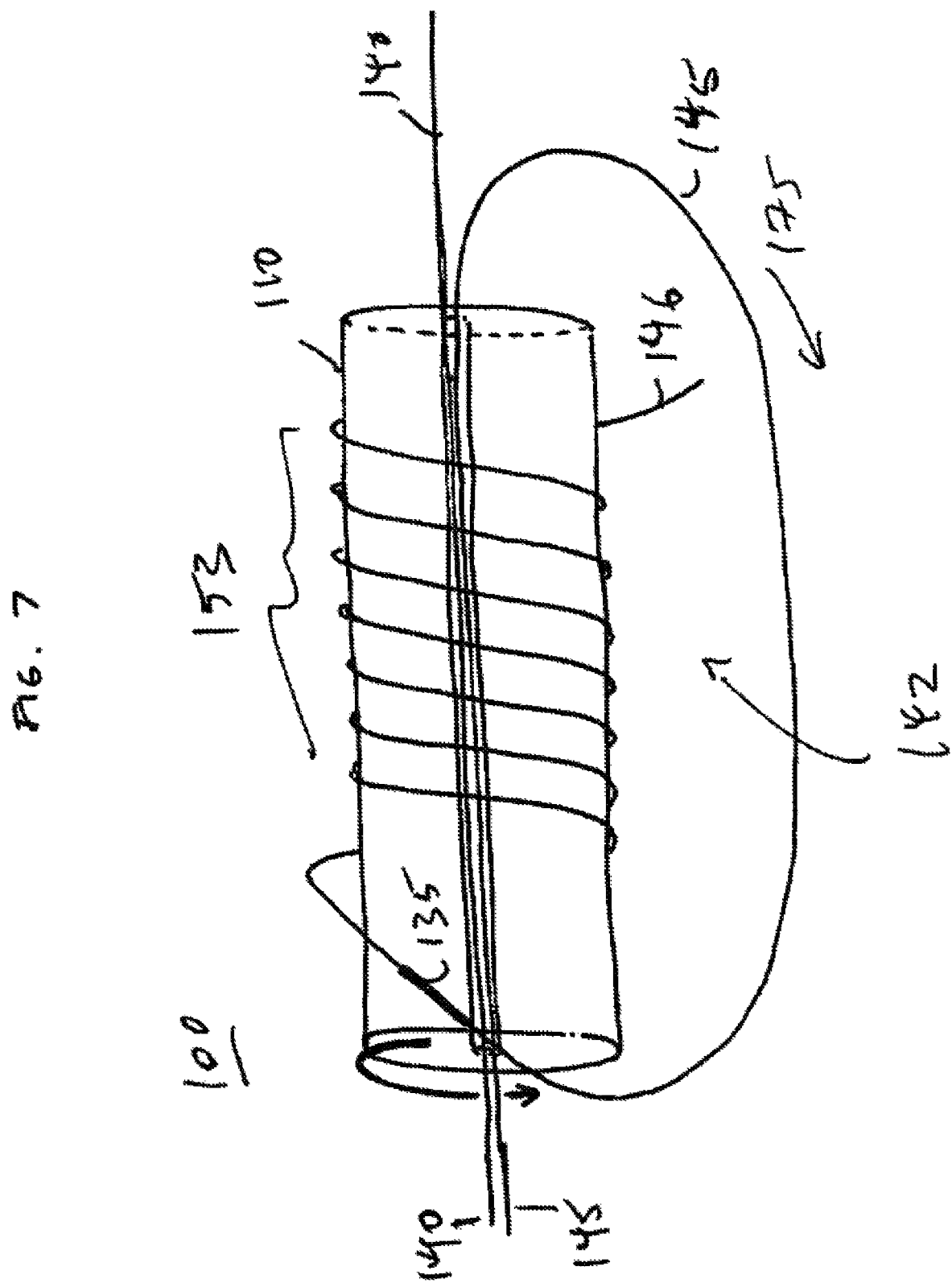

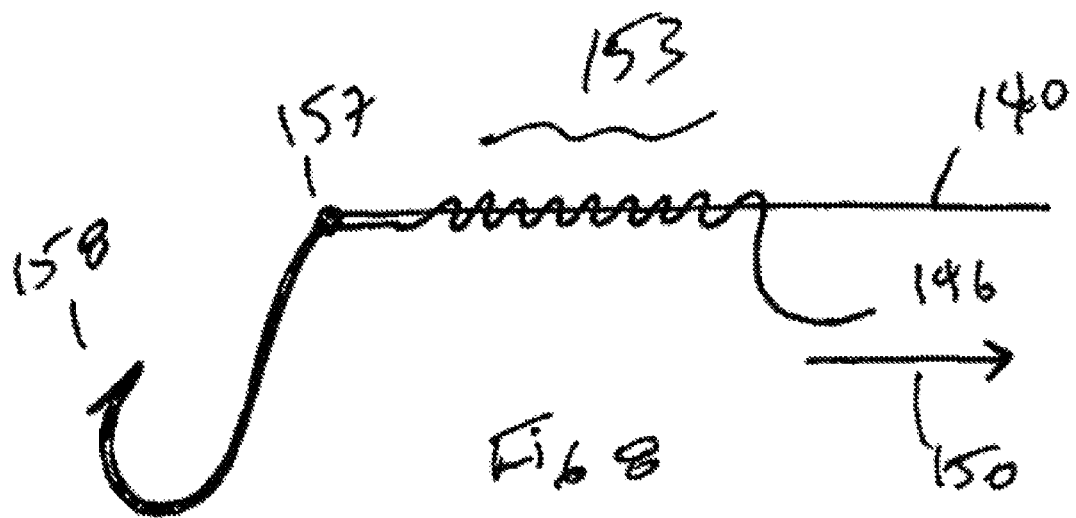
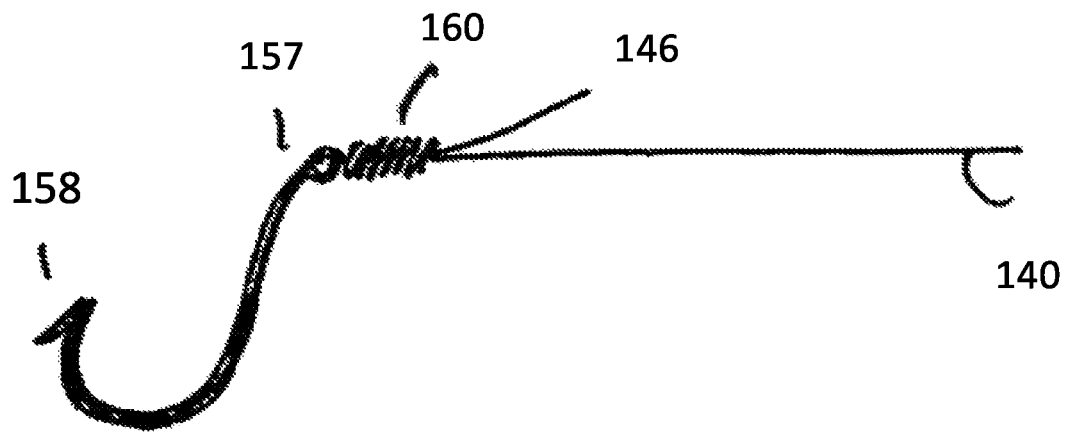
FIG. 9

KNOT TYING APPARATUSES AND FISHING RELATED STRUCTURES

CLAIM FOR PRIORITY

This application claims priority to Provisional Application Ser. No. 63/077,842, titled Knot Tying Apparatus, filed in the U.S. Patent and Trademark Office on Sep. 14, 2020, the entire disclosure of which is hereby incorporated herein by reference.

FIELD

The technology disclosed in this patent document relates knot tying.

BACKGROUND

Many different types of fishing knots can be used including the Uni-Knot. The Uni Knot can be used to tie a hook directly to a hook or to join two lines together, sometime referred to as a double uni-knot.

SUMMARY

Embodiments according to the present invention can provide knot tying apparatuses and fishing related structures. Pursuant to these embodiments, an apparatus for tying knots can include a body defined by a length along a longitudinal axis of the body and by an outer surface that extends around the longitudinal axis of the body from a first end of the body to a second end of the body. A trench in the body can extend from the outer surface of the body toward the longitudinal axis for the length of the body. A channel can extend for the length of the body and is exposed at the first and second ends of the body. A neck can be between the trench and the channel, the neck can be configured to contain first and second flexible lines extending in the channel extending from the first end of the body to the second end of the body and a line guide can be on the outer surface of the body configured to hold the first or second line at an oblique angle relative to a direction of the longitudinal axis.

BRIEF DESCRIPTION OF THE DRAWINGS

FIG. 6 is a cross sectional view of the apparatus in FIG. 1 showing the trench including the neck defined by the opposing protrusions and that are in a non-contacting relationship such that a gap is maintained between the opposing protrusions so that the flexible lines may pass between the opposing protrusions to be secured within the channel in some embodiments according to the invention.

FIG. 7 is an isometric view of the apparatus of FIG. 1 having a first fishing line and a second fishing line inserted into the channel via the trench in some embodiments according to the invention.

FIG. 8 is a schematic illustration of a fishing hook having a fishing line attached thereto by using the apparatus of FIG. 1 and FIG. 7 to attach a plurality of turns of the fishing line laterally spaced apart around the fishing line in some embodiments according to the invention.

FIG. 9 is a schematic illustration of the fishing hook of FIG. 8 having a tag end of the fishing line pulled in a direction so that the plurality of turns slide together toward the eye of the fishing hook to complete the knot.

DETAILED DESCRIPTION OF EMBODIMENTS ACCORDING TO THE INVENTION

Embodiments according to the present invention relate to an apparatus configured to tie knots. For example, in some environments according to the invention the apparatus can be used to tie what is commonly referred to as a uni-knot as shown herein. Other types of knots may also be tied using the apparatus described herein.

Figure 1:
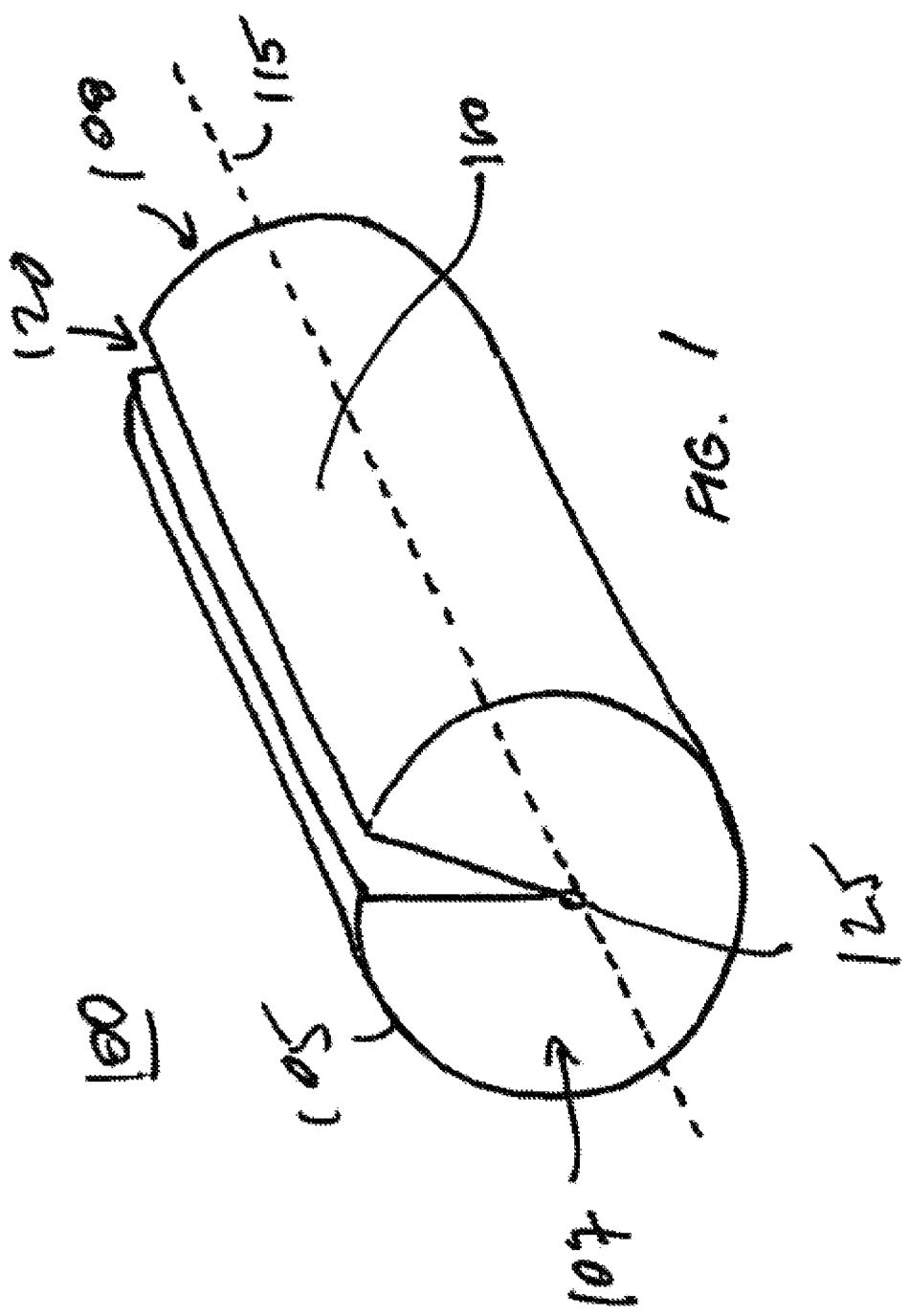
FIG. 1 is an isometric view of an apparatus including a cylindrical body having a trench formed therein that extends from an outer surface of the body towards a longitudinal axis of the body along a length of the body in some embodiments according to the invention.

FIG. 1 is an isometric view of an apparatus 100 including a cylindrical body 105 having a trench 120 formed therein that extends from an outer surface 110 of the body towards a longitudinal axis 115 of the body 105 along a length 106 of the body 105. The trench 120 extends from a first end 107 of the body 105 to a second end 108 of the body 105 where the trench 120 is exposed. The bottom of the trench 120 is connected to a channel 124 that also extends in the body 105 from the first end 107 to the second end 108. It will be understood that in some embodiments according to the invention, the body 105 can have other shapes such as a cone shape, spherical shape, truncated cylinder shapes, etc. It will also be understood that the shape and size of the body 105 is such that the apparatus 100 can be conveniently held in a user's hand so that the uni-knot is formed by rotating the body 105 around flexible lines that are secured in the channel 125 as shown, for example, in FIG. 7 and is not limited by the present disclosure.

It will be understood that the material from which the apparatus 100 is formed can be, for example, polyethylene foam, cork, closed cell foam, or another type of deformable material that can secure a flexible line when the material is in a relaxed state, but can be deformed to insert the flexible line which can then be secured in the body 105 when the material is released and returns to the relaxed state so that while the apparatus 100 can be rotated to tie the knot after which the flexible line can be removed from the body 105 by, for example, pulling the body 105 away to release the knot from the channel 115. In some embodiments according to the invention, the material from which the apparatus 100 is formed can be rigid. In some embodiments according to the invention, the material from which the apparatus 100 is formed can be a buoyant material so that the apparatus may also provide a "bobber" to be used during fishing. Accordingly, any material that provides for the insertion, securing, and release of the line(s) can be used in embodiments according to the present invention and are not limited by the present disclosure.

It will also be understood that the trench 120 can have any shape that allows for the insertion/removal of the flexible lines from the channel 125. For example, in some embodiments according to the invention, the side walls of the trench 120 can be tapered inward such that the diameter of the trench is narrower at the base than at the opening. In other embodiments according to the invention, the trench 120 can have straight side walls extending toward the channel 125. In still further embodiments according to the invention, the trench 120 can be a slit formed in the body 105 wherein the side walls of the trench 120 contact one another such that the material from which the body 105 is formed still allows for the insertion of the flexible lines downward through the trench 120 for securing within the channel 125 in some embodiments according to the invention.

Figure 2:
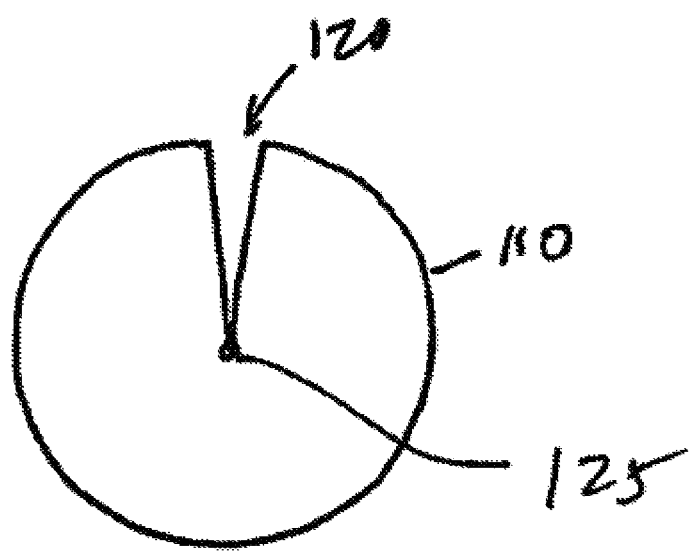
FIG. 2 is an end view of the apparatus in FIG. 1 in some embodiments according to the invention.

As further shown in FIGS. 1 and 2 the channel 125 can be connected to the trench 120 such that flexible lines can be secured in the channel 125 during rotation of the apparatus 100 about the longitudinal axis 115. For example, in some embodiments according to the invention, the channel 125 can be a cylindrical channel that runs the length of the body 105. In other embodiments according to the invention, the channel 125 can be a slit at the bottom of the trench 120 that is configured to secure the lines within the channel 125 during rotation of the body 105 around the longitudinal axis 115. Accordingly, in some embodiments according to the invention, the channel 125 can be the lowest portion of the trench 120 wherein the trench 120 and the channel 125 are different portions of a continuous slit that extends from the outer surface 110 toward the longitudinal axis 115.

Figure 3:
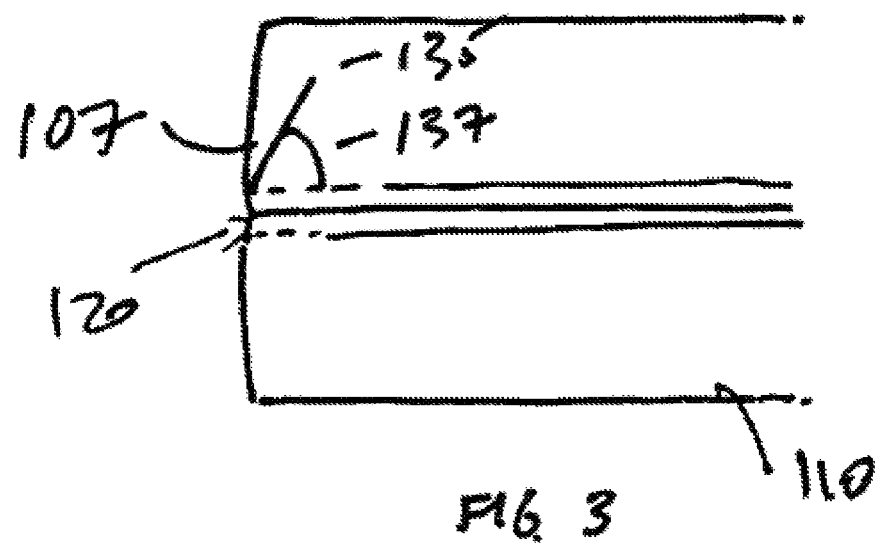
FIG. 3 is a top view of the apparatus in FIG. 1 showing the opening of the trench in the body and further showing a line guide on the outer surface of the body which is configured to receive/securing a tag end of a flexible line which can be rotated around the longitudinal axis during tying of the knot in some embodiments according to the invention.

FIG. 3 is a top view of the apparatus 100 showing the opening of the trench 120 in the body 105 and further showing a line guide 135 on the outer surface 110 of the body 105 which is configured to receive/securing a tag end of a flexible line which can be rotated around the longitudinal axis 115 during tying of the knot in some embodiments according to the invention.

Figure 4:
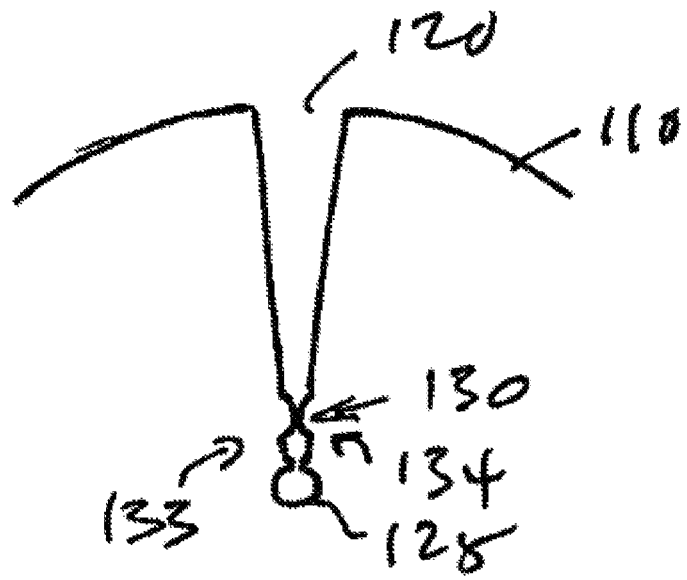
FIG. 4 is a cross sectional view of the apparatus in FIG. 1 showing the trench having tapered sidewalls that are angled inward toward the longitudinal axis in some embodiments according to the invention.

FIG. 4 is a cross sectional view of the apparatus 100 showing the trench 120 having tapered sidewalls that are angled inward toward the longitudinal axis 115 in some embodiments according to the invention. As shown in FIG. 4 the trench 120 contacts a neck 130 that includes protrusions 133 and 134 that extend from the opposing side walls of the trench 120 to come into contact such that the flexible line can be forced past the contacting portions of the opposing protrusions 133 and 134 to be secured in the channel 125.

Figure 5:
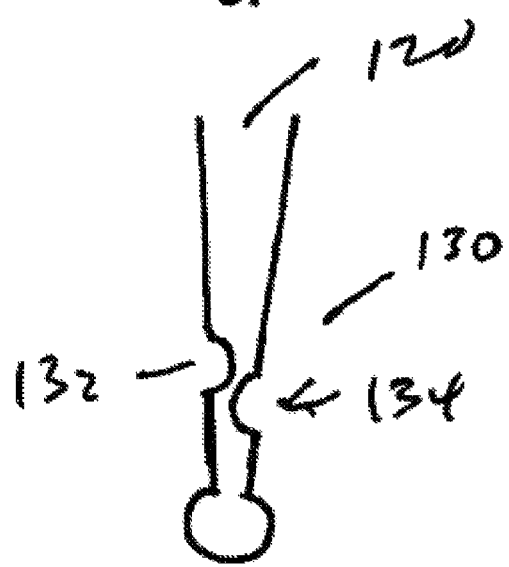
FIG. 5 is a cross sectional view of the apparatus in FIG. 1 including the trench and the neck defined by opposing protrusions and that are offset from one another on the opposing side walls of the trench in some embodiments according to the invention.

FIG. 5 is a cross sectional view of the apparatus 100 including the trench 120 and the neck 130 defined by opposing protrusions 133 and 134 that are offset from one another on the opposing side walls of the trench 120 in some embodiments according to the invention.

FIG. 6 is a cross sectional view of the apparatus 100 showing the trench 120 including the neck 130 defined by the opposing protrusions 133 and 134 that are in a non-contacting relationship such that a gap is maintained between the opposing protrusions 133 and 134 so that the flexible lines may pass between the opposing protrusions 133 and 134 to be secured within the channel 125 in some embodiments according to the invention. It will be understood that in each of FIGS. 4-6, the neck 130 is configured to allow insertion of the flexible lines past the neck 130 into the channel 125 where the flexible lines can be secured during rotation of the body 100 about the longitudinal axis 115. It will be further understood that the flexible lines are maintained within the channel 125 during rotation but can be easily withdrawn from the channel 125 through the neck 130 into the trench 120 and past the outer surface 110 after the knot is tied.

FIG. 7 is an isometric view of the apparatus 100 having a first fishing line 140 and a second fishing line 145 inserted into the channel 125 via the trench 120. As further shown in FIG. 7, the first and second fishing lines 140 and 145 extend the length of the channel 125 and protrude from the first and second ends 107 and 108. A tag end 146 of the second line 145 is fed back in a direction 175 from the second end 108 toward the first end 107 to form a loop 142 and is inserted into the line guide 135 to be held at an oblique angle 137 relative to the longitudinal axis 115. Once the tag end 146 is secured in the line guide 135 at the oblique angle 137, the user rotates the apparatus 100 around the longitudinal axis 115 so that the tag end 146 passes through the loop 142 a plurality of times. In some embodiments according to the present invention, the user can rotate the apparatus 100 around the longitudinal axis 115 so that the tag end 146 passes through the loop 142 at least seven times.

Once the tag end 146 has been passed through the loop 142 the desired number of times, the user can remove the first and second fishing lines 140 and 145 from the channel 125 via the trench 120 so that the apparatus 100 is removed to provide the arrangement shown in FIG. 8 where a plurality of turns 153 of the second fishing line 145 are laterally spaced apart around the first fishing line 140. As shown in FIG. 9, the tag end 146 of the second fishing line 145 is pulled in a direction 150 so that the plurality of turns 153 slide together toward the eye 157 of the fishing hook 158 to complete the knot 160.

It will be understood that although embodiments according to the invention are described with reference to fishing lines and fishing hooks, embodiments according to the invention can be practiced in applications other than fishing, such as other areas where knots can be tied.

In this description like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the disclosure, the terms about and substantially are used to represent the inherent degree of uncertainty that may be attributed to any quantitative comparison, value, measurement, or other representation. The terms about and substantially are also used herein to represent the degree by which a quantitative representation may vary from a stated reference without resulting in a change in the basic function of the subject matter at issue. Comprise, include, and/or plural forms of each are open ended and include the listed parts and can include additional parts that are not listed. And/or is open-ended and includes one or more of the listed parts and combinations of the listed parts.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed:

1. An apparatus comprising:
   a body defined by a length along a longitudinal axis of the body and by an outer surface that extends around the longitudinal axis of the body from a first end of the body to a second end of the body;
   a trench in the body extending from the outer surface of the body toward the longitudinal axis for the length of the body;
   a channel that extends for the length of the body and is exposed at the first and second ends of the body;
   a neck between the trench and the channel, the neck configured to contain first and second flexible lines extending in the channel extending from the first end of the body to the second end of the body; and
   a line guide on the outer surface of the body configured to hold the first or second line at an oblique angle relative to a direction of the longitudinal axis.

2. The apparatus of claim 1 wherein the neck comprises a first protrusion from a first side wall of the trench extending toward a second side wall of the trench opposite the first side wall of the trench.

3. The apparatus of claim 2 further comprising:
   a second protrusion from the second side wall of the trench extending to contact the first protrusion when the neck is in a relaxed state.

4. The apparatus of claim 3 wherein the body is formed of a deformable material.

5. The apparatus of claim 4 wherein the deformable material comprises polyethylene foam.

6. The apparatus of claim 2 further comprising:
   a second protrusion from the second side wall of the trench extending toward the first side wall of the trench.

7. The apparatus of claim 6 wherein the first and second protrusions are in a non-contacting relationship with one another to define an opening therebetween that exposes the channel.

8. The apparatus of claim 7 wherein the first and second protrusions are positioned directly opposite one another on the first and second side walls, respectively.

9. The apparatus of claim 7 wherein the first and second protrusions are positioned offset from one another on the first and second side walls.

10. The apparatus of claim 9 wherein the first and second protrusions extend past one another.

11. The apparatus of claim 1 wherein the line guide comprises a recess on the outer surface of the body configured to hold the first or second line at the oblique angle relative to the direction of the longitudinal axis.

12. The apparatus of claim 11 wherein the line guide is located proximate to the first or second end of the body.

13. The apparatus of claim 11 wherein the body is formed of a deformable material.

14. The apparatus of claim 1 wherein the line guide comprises a protrusion on the outer surface of the body configured to hold the first or second line at the oblique angle relative to the direction of the longitudinal axis.

15. The apparatus of claim 1 wherein the line guide comprising a plurality of line guides on the outer surface of the body each being configured to hold the first or second line at the oblique angle relative to the direction of the longitudinal axis.

16. The apparatus of claim 1 wherein the body is a buoyant material.

17. An apparatus comprising:
   a body including an outer surface of the body;
   a channel of the body that extends for a length in the body and is exposed at a first end of the channel and at a second end of the channel;
   a trench in the body extending from the outer surface of the body toward the channel of the body;
   a neck between the trench and the channel, the neck configured to contain first and second flexible lines extending in the channel from the first end of the channel to the second end of the channel; and
   a line guide on the outer surface of the body configured to hold the first flexible line or the second flexible line at an oblique angle relative to a direction of the channel.

18. The apparatus of claim 17 wherein the trench and the channel of the body are different portions of a continuous slit that extends from the outer surface of the body to the channel.

19. The apparatus of claim 17 wherein the channel comprises a lowest portion of the trench.

20. The apparatus of claim 17 wherein the neck comprises a first protrusion from a first side wall of the trench extending toward a second side wall of the trench opposite the first side wall of the trench.

21. An apparatus comprising:
   a body including an outer surface of the body;
   a channel of the body that extends for a length in the body and is exposed at a first end of the channel and at a second end of the channel;
   a trench in the body extending from the outer surface of the body toward the channel of the body, wherein a portion of the trench is configured to contain first and second flexible lines extending in the channel; and
   a securing line guide on the outer surface of the body configured to hold the first flexible line or the second flexible line at an oblique angle relative to a direction of the channel while rotating the body.

22. The apparatus of claim 21 wherein the trench and the channel of the body are different portions of a continuous slit that extends from the outer surface of the body to the channel.

23. The apparatus of claim 21 wherein the channel comprises a lowest portion of the trench.

24. The apparatus of claim 21 wherein the securing line guide comprises a plurality of line guides on the outer surface of the body each being configured to hold the first or second line at the oblique angle relative to the direction of the longitudinal axis.

25. The apparatus of claim 21 wherein the securing line guide comprises a protrusion on the outer surface of the body configured to hold the first or second line at the oblique angle relative to the direction of the longitudinal axis.

26. The apparatus of claim 21 wherein the line guide comprises a recess on the outer surface of the body configured to hold the first or second line at the oblique angle relative to the direction of the longitudinal axis.

27. The apparatus of claim 26 wherein the securing line guide is located proximate to the first or second end of the body.

\* \* \* \* \*